United States Patent
Beauvais et al.

(10) Patent No.: US 11,845,433 B1
(45) Date of Patent: Dec. 19, 2023

(54) CHASSIS POWER MANAGEMENT

(71) Applicant: Ford Global Technologies, LLC, Dearborn, MI (US)

(72) Inventors: Brandon Beauvais, Dearborn, MI (US); Timothy Panagis, Ypsilanti, MI (US); Chad Michael Korte, Grosse Ile, MI (US); Daniel A. Gabor, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 13 days.

(21) Appl. No.: 17/831,851

(22) Filed: Jun. 3, 2022

(51) Int. Cl.
  *G06F 7/70* (2006.01)
  *B60W 30/18* (2012.01)
  *B60L 3/12* (2006.01)
  *B60L 3/00* (2019.01)

(52) U.S. Cl.
  CPC ..... *B60W 30/18109* (2013.01); *B60L 3/0076* (2013.01); *B60L 3/12* (2013.01); *B60W 2510/0666* (2013.01); *B60W 2510/18* (2013.01); *B60W 2510/20* (2013.01)

(58) Field of Classification Search
  CPC ... B60W 30/18109; B60W 2510/0666; B60W 2510/18; B60W 2510/20; B60L 3/0076; B60L 3/12; G06F 7/70
  USPC .......................................................... 701/70
  See application file for complete search history.

(56) References Cited

U.S. PATENT DOCUMENTS

| | | | |
|---|---|---|---|
| 2015/0224845 A1* | 8/2015 | Anderson | B60G 17/019 701/37 |
| 2017/0279170 A1* | 9/2017 | O'Hora | H01M 50/204 |
| 2020/0031295 A1* | 1/2020 | Miller | B60R 16/03 |
| 2020/0081511 A1* | 3/2020 | Brown | G06F 1/305 |
| 2022/0009481 A1* | 1/2022 | Inoue | B60W 10/20 |
| 2022/0371531 A1* | 11/2022 | Eifert | H02J 7/0068 |

\* cited by examiner

*Primary Examiner* — Shardul D Patel
(74) *Attorney, Agent, or Firm* — Burr & Forman, LLP

(57) ABSTRACT

A vehicle control system includes a brake module operably coupled to a braking system to provide a braking torque request, a steering module operably coupled to a steering system to provide a steering input request, a power supply, and a power management module. The power supply is operably coupled to the brake module and the steering module to provide power to the brake module and the steering module. The power supply has a power budget indicating a maximum power providable to the brake module and the steering module. The power management module is operably coupled to sensors to receive a power draw indication from one of the brake module or the steering module and control power draw of the other of the steering module or the brake module to maintain a combined power draw of the brake module and the steering module below the power budget.

20 Claims, 4 Drawing Sheets

CHASSIS POWER MANAGEMENT

TECHNICAL FIELD

Example embodiments generally relate to vehicle control algorithms and, more particularly, relate to a system and method for providing management of chassis loads to manage power required from the power supply.

BACKGROUND

In today's electric vehicles (EVs), and even in some internal combustion engine (ICE) vehicles, both the brake system and the power steering system use electrical energy to provide corresponding services to the driver. The electrical energy used by these systems is typically provided by a single or common power supply. During certain situations, these systems may encounter large transient loads. Given that they share a single power supply, it may be desirable to develop a power management feature that can be used to provide balanced rationing of the available power in any particular situation.

BRIEF SUMMARY OF SOME EXAMPLES

In accordance with an example embodiment, a vehicle control system for a vehicle may be provided. The system may include a brake module operably coupled to a braking system of the vehicle to provide a braking torque request to the braking system, a steering module operably coupled to a steering system of the vehicle to provide a steering input request to the steering system, a power supply, and a power management module. The power supply may be operably coupled to the brake module and the steering module to provide power to the brake module and the steering module. The power supply may have a power budget indicating a maximum power providable to the brake module and the steering module. The power management module may be operably coupled to one or more sensors to receive a power draw indication from one of the brake module or the steering module and control power draw of the other of the steering module or the brake module to maintain a combined power draw of the brake module and the steering module below the power budget.

In another example embodiment, a method of protecting a power supply that powers a brake module and a steering module of a vehicle may be provided. The method may include determining a power budget for the power supply, monitoring a power draw indication for the steering module, detecting a trigger event based on the power draw indication, and, responsive to detection of the trigger event, adjusting a power draw or a limit on the power draw of the brake module.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
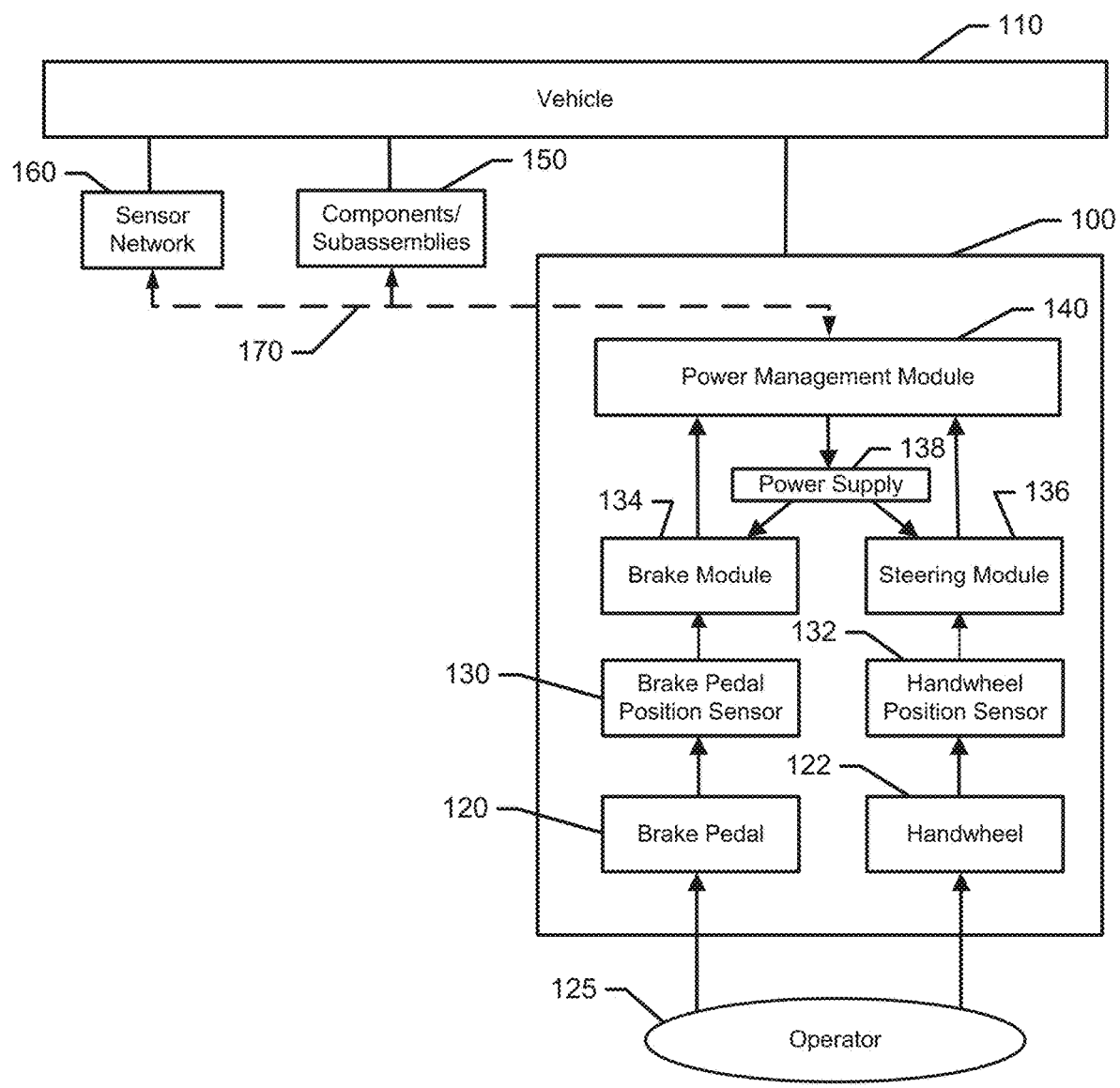
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

FIG. 1 illustrates a block diagram of a vehicle control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include one or more input devices in the form of one or more control pedals, wheels, buttons, levers, etc. In some embodiments, the control pedals may include a foot-operated brake pedal 120. However, the control pedals could alternatively be hand operated or any other operable member via which an operator 125 may provide an input indicative of an intent of the operator 125 relative to controlling the provision of braking torque for application to the wheels of the vehicle 110. Another example input device may include a steering wheel (or handwheel 122). The handwheel 122 may be rotatable by the operator 125 to provide an input indicative of an intent of the operator 125 relative to controlling a direction of travel of the vehicle 110, typically through control of the turning of the front wheels of the vehicle 110.

The control system 100 may also include position sensors for each of the brake pedal 120 (which may have a corresponding brake pedal position sensor 130) and the handwheel 122 (which may have a corresponding handwheel position (or angle) sensor 132). The brake pedal position sensor 130 and the handwheel position sensor 132 may provide data indicative of the precise position of the brake pedal 120 and the handwheel 122 to a brake module 134 and a steering module, respectively.

The brake module 134 may include an anti-lock brake system (ABS) and/or a brake boost system that are operably coupled to braking components or other components capable of providing a negative torque. Brake boost systems are commonly used in automotive settings in order to increase the actuation force from a driver's foot on the brake pedal 120 to acceptable levels in order to properly engage a vehicle's brakes. Newer vehicles are now often equipped with various automated driver assistance features such as electric brake boost (EBB) systems to take the place of the conventional vacuum style brake boost system. EBB systems therefore determine a driver's braking demand and adjust the braking force accordingly. The brake module 134 draws electrical power for executing its corresponding functions from a power supply 138.

The steering module 136 may include power steering, steer-by-wire or other electronically controlled or enhanced functions that translate movement of the handwheel 122 to corresponding turning of the front wheels (or other steering input wheels) of the vehicle 110. The steering module 136 also draws electrical power for executing its corresponding functions from the power supply 138. Thus, both the brake module 134 and the steering module 136 draw power from a common source, namely the power supply 138.

Given that the brake module 134 and the steering module 136 may each be understood to have respective peak periods of activity, and therefore also corresponding peak periods of power draw from the power supply 138, it may be desirable to manage the power draw to ensure that the power draw is maintained below the maximum capacity of the power supply 138. Moreover, to the extent the power supply 138 may have different maximum capacity ratings for corresponding different driving conditions or modes of operation, it may also be desirable that the power draw be intelligently managed in consideration of the potential for different capacity limitations on the power supply 138 at different times, or in different modes of operation. To accomplish such intelligent management, example embodiments may employ a power management module 140. The power management module 140 may be configured to determine individual requests or requirements for power by the brake module 134 and the steering module 136, and then manage the provision of power from the power supply 138 to the brake module 134 and the steering module 136 as described herein based on inputs from the brake module 134, the steering module 136, and/or other components of the vehicle 110. In some cases, the control system 100 may be configured to perform other tasks related or not related to steering and braking control or performance management. However, those tasks are largely outside the scope of this disclosure and therefore will not be described in detail herein.

In an example embodiment, the control system 100 may receive information that is used to determine vehicle status from various components or subassemblies 150 of the vehicle 110. The components or subassemblies 150 may include the brake pedal 120, the handwheel 122 and any number of other components. Additionally or alternatively, various sensors that may be operably coupled to the components or subassemblies 150 may be included, and may provide input to the control system 100 that is used in determining vehicle status. Such sensors may be part of a sensor network 160 and sensors of the sensor network 160 may be operably coupled to the control system 100 (and/or the components or subassemblies 150) via a vehicle communication bus (e.g., a controller area network (CAN) bus) 170. The sensors may include the brake pedal position sensor 130, the handwheel position sensor 132, and any number of other sensors. In some cases, the sensors may include current and/or voltage sensors that are operably coupled to the brake module 134 and/or the steering module 136 to detect the amount of current or voltage drawn by the brake module 134 and/or the steering module 136, respectively.

The components or subassemblies 150 may include, for example, a braking system, a propulsion system, a steering system, and/or a wheel assembly of the vehicle 110. The braking system may be configured to provide braking inputs to braking components of the vehicle 110 (e.g., electro-mechanical brakes, hydraulic brakes, regenerative brakes, etc.) based on a braking torque determined by the brake module 134. The braking system may also include more than one type of braking hardware. For example, the braking system of the vehicle 110 may include respective instances of, or a combination of, friction brakes, hydraulic brakes and electro-mechanical brakes. The propulsion system may include a gas engine, electric motor, or any other suitable propulsion device. In some cases, the propulsion system may also incorporate drive-by-wire components and a corresponding control paradigm. The steering system may include the handwheel 122 and the steering module 136 described above.

Thus, many of the signals provided to the power management module 140 may be provided via the vehicle communication bus 170 (or CAN bus). By monitoring the CAN bus, the power management module 140 may determine either or both of the power demands being requested by the brake module 134 and the steering module 136. Moreover, one or more corresponding sensors of the sensor network 160 that may be operably coupled to other modules of the vehicle 110 may also provide power input information to the power management module 140 for consideration and control thereby.

Accordingly, for example, the control system 100 may be able to receive numerous different parameters, indications and other information that may be related to or indicative of different situations or conditions associated with vehicle status. The control system 100 may also receive information indicative of the intent of the operator 125 relative to control of various aspects of operation of the vehicle 110 and then be configured to use the information received to provide information to the power management module 140 in order to control application of power from the power supply 138 of the vehicle 110. The control system 100 of FIG. 1 may be similar to conventional systems in many respects, except that, the control system 100 (and in some cases specifically the power management module 140) may be modified to respond to situations in which the power demands made upon the power supply 138 may be deemed excessive as described in greater detail in reference to FIGS. 2-4 below.

Figure 2:
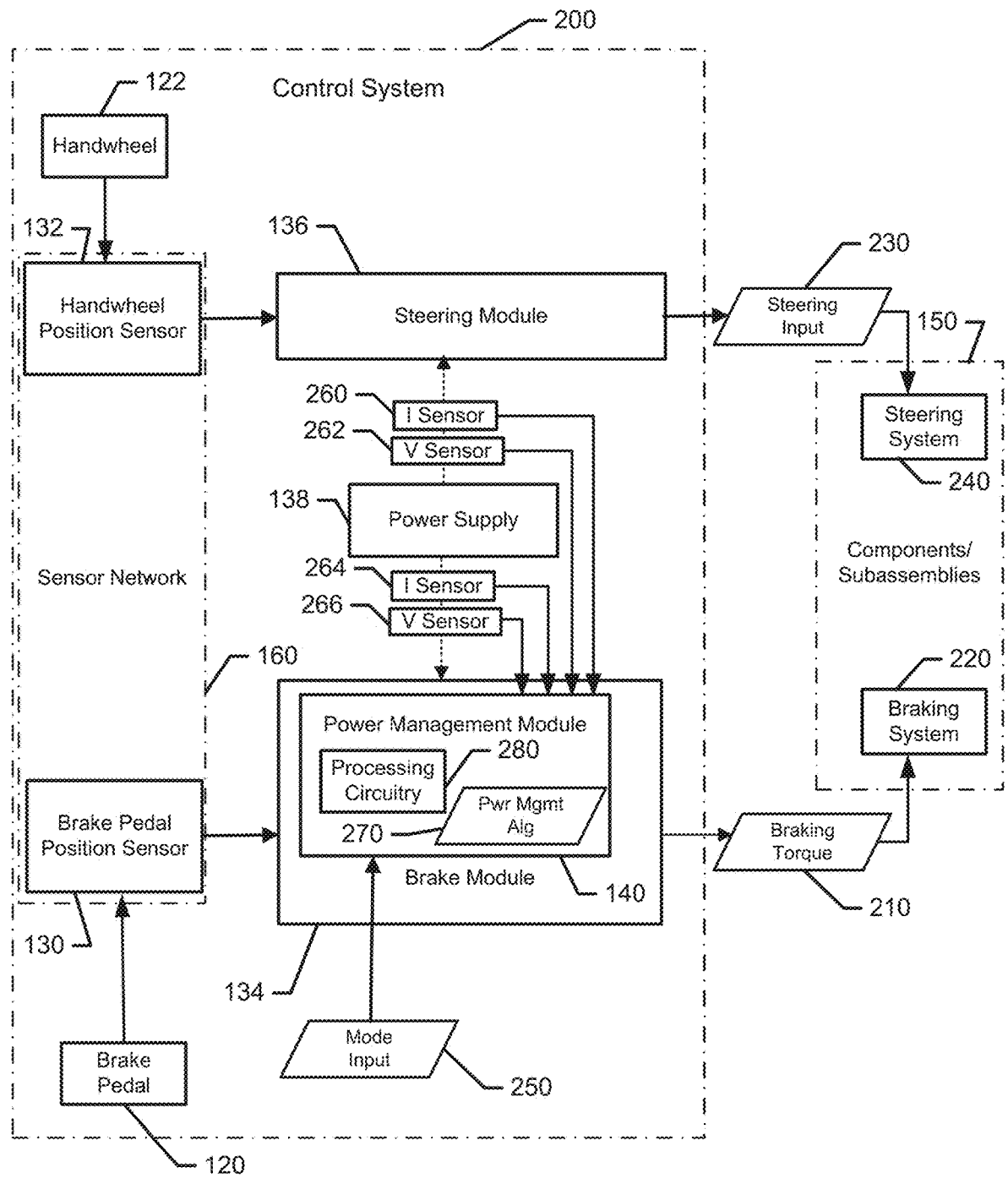
FIG. 2 illustrates a block diagram of some components of the vehicle control system of FIG. 1 in accordance with an example embodiment.

FIG. 2 illustrates a block diagram of various components of a control system 200 (which is a specific example of control system 100 of FIG. 1) in greater detail. In this regard, for example, FIG. 2 illustrates various ones of the components of FIG. 1 in a particular arrangement in which the power management module 140 is located at (or a sub-module of) the brake module 134. Thus, whereas FIG. 1 illustrates a more general case in which the power management module 140 may be located anywhere in the control system 100, the example of FIG. 2 provides one non-limiting and more detailed case in which the brake module 134 effectively becomes the arbitration agent for power management decisions that involve the brake module 134 and the steering module 136.

As shown in FIG. 2, the control system 200 may include the brake pedal 120, which may have the corresponding brake pedal position sensor 130, and the handwheel 122, which may have the associated handwheel position sensor 132. The power supply 138 may provide power to the brake module 134 and the steering module 136. Under normal driving conditions, inputs from the operator 125 may be provided at the brake pedal 120 and handwheel 122, and inputs from the respective sensors (e.g., the brake pedal position sensor 130 and the handwheel position sensor 132) may be provided to the brake module 134 and the steering module 136, respectively. The brake module 134 (which may be an ABS module and/or include an EBB module) may then translate inputs received from the sensor network 160 into a braking torque request 210 that may be communicated to a braking system 220. Similarly, the steering module 136, which may be or include a power steering control module (PSCM), may then translate inputs received from the sensor network into a steering input request 230 that may be communicated to a steering system 240. The steering system 240 and the braking system 220 may include any of the components mentioned above in connection with describing such systems, along with other components that are outside the scope of this disclosure.

During the operations described above, the power supply 138 may fully supply the power requirements of each of the steering module 136 and the brake module 134 under normal circumstances. However, it is possible that transient conditions may exist where high amounts of activity related to either or both of steering and braking may cause correspondingly high power requirements to be generated. The power supply 138 is generally rated to be able to handle maximum power requests from each of the brake module 134 and the steering module 136 individually. The vehicle 110 may have certain operational modes in which the power supply 138 is limited beyond the normal rated power limits. For example, a user selected mode, or an automatically selected control mode that may be initiated when certain operational conditions are not considered normal may exist in addition to the normal unrestricted mode of operation. In such cases, the normal rated power of the power supply may be, for example, 1600 W, whereas a reduced rated power in a limited performance mode may be, for example, 850 W. Thus, the power management module 140 must be able to perform its power management functions in light of the rated power limits that correspond to the currently selected mode. A mode input 250 may therefore be received by the power management module 140 in some embodiments in order to indicate a value of the maximum power that can be supplied by the power supply 138 for the currently selected mode.

While in operation to support generation of the steering input request 230, the steering module 136 draws power from the power supply 138 that may be measured. As an example, one way to measure the power draw may be to include one or both of current and voltage sensors as part of the sensor network 160, as part of the steering module 136, or as standalone sensors, to measure the power draw associated with generation of the steering input request 230. As such, for example, a steering module current sensor 260 and/or a steering module voltage sensor 262 may be provided to measure the power drawn by the steering module 136. Real time, or near real time, measurements from the steering module current sensor 260 and/or the steering module voltage sensor 262 may therefore be communicated to the power management module 140.

Similarly, while in operation to support generation of the braking torque request 210, the brake module 134 draws power from the power supply 138 that may also be measured. As an example, one way to measure the power draw may be to include one or both of current and voltage sensors as part of the sensor network 160, as part of the brake module 134, or as standalone sensors, to measure the power draw associated with generation of the braking torque request 210. As such, for example, a brake module current sensor 264 and/or a brake module voltage sensor 266 may be provided to measure the power drawn by the brake module 134. Real time, or near real time, measurements from the brake module current sensor 264 and/or a brake module voltage sensor 266 may therefore be communicated to the power management module 140. The power management module 140 may then execute a power management algorithm 270 via processing circuitry 280 (e.g., a processor and memory) of the power management module 140.

The power management algorithm 270 may monitor various parameters (e.g., via the CAN bus, or via direct input from sensors) and initiate control functions based on the measurements made. The paradigm for control could vary in different implementations, although the location of the power management module 140 may influence which paradigms may work (or work best) for given different locations. For example, if the power management module 140 were located in the steering module 136, the power management module 140 may receive current and/or voltage draw information from the brake module current sensor 264 and/or a brake module voltage sensor 266 and compare the current and/or voltage draw information to thresholds set for either or both. The thresholds may be recorded in memory of the processing circuitry 280, and when met, the memory may also record (e.g., in tabular format) a corresponding limit to apply to the power that can be drawn by the steering module 136, at which location the power management module 140 is resident in this example.

However, the reverse situation is shown in the example of FIG. 2 in that the power management module 140 is located at the brake module 134. Thus, in the depicted example, the power management module 140 may receive current and/or voltage draw information from the steering module current sensor 260 and/or the steering module voltage sensor 262 and compare the current and/or voltage draw information to thresholds set for either or both. The thresholds may be recorded in memory of the processing circuitry 280, and when met, the memory may also record (e.g., in tabular format) a corresponding limit to apply to the power that can be drawn by the brake module 134. In effect, the brake module 134 may determine what power draw is being demanded by the steering module 136, and then manage its own (i.e., the brake module's 134) power draw to ensure that the steering module 136 can get full support for the transient condition currently underway. Thus, the brake module 134 may momentarily adjust its own power consumption to enable the steering module 136 to handle the transient condition. In this example, whether the brake module 134 (and more particularly the power management module 140 located or embodied at the brake module 134) uses current or voltage as an indication of power (or whether both are measured), the reaction by the brake module 134 to the power indication measured will necessarily have some small delay (e.g., typically less than 50 msec) for recognition of the threshold being reached and generation of the control signals needed to adjust power at the brake module 134 based on hitting the threshold. Although the threshold may be set conservatively to minimize any possible chance of a rate increase so fast that the threshold may be hit at a given instant, and power demand may continue to increase at a corresponding rate of increase until the power rating for the current mode is exceeded, it may nevertheless by desirable to introduce a way to forecast future power draw that obviates any issues associated with hitting the threshold at high rates of increasing power. The power management module 140 may be configured (e.g., via the programming of the power management algorithm 270) to handle any or all of the paradigms described above, and FIGS. 3 and 4 illustrate some examples of different power management algorithm 270 control paradigms.

Figure 3:
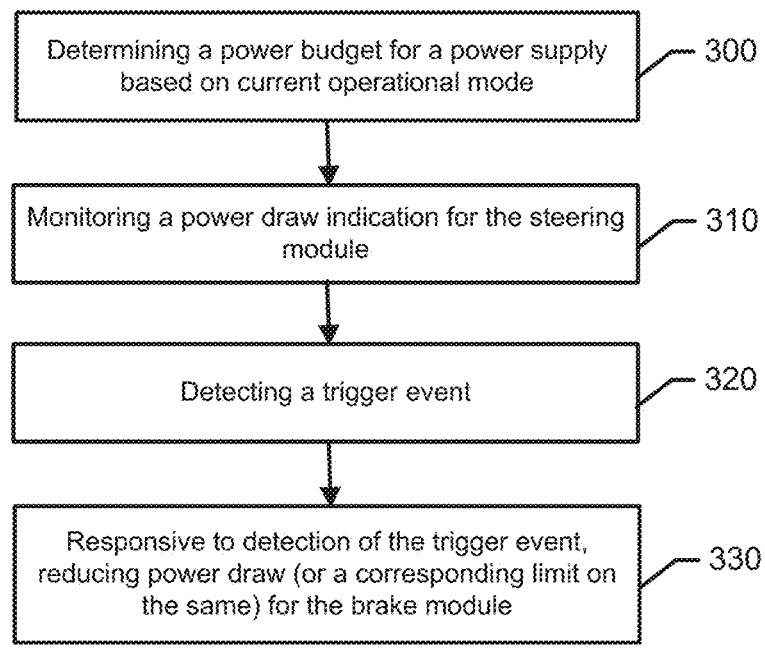
FIG. 3 illustrates a block diagram showing control flow associated with a power management algorithm in accordance with an example embodiment.

FIG. 3 illustrates a block diagram of control flow that may be associated with execution of the power management algorithm 270 in accordance with an example embodiment. In this regard, at operation 300, a determination may be made as to a power budget for the power supply 138 based on the current operational mode (e.g., as indicated by mode input 250 from FIG. 2). Notably, operation 300 may be optional, and may be restricted to systems that are able to employ different power budgets. Thereafter, at operation 310, a power draw indication for power being drawn by the steering module may be monitored. The power draw indication may be a current measurement, a voltage measurement, a combination thereof, or other suitable indications. A trigger event may be detected at operation 320. The trigger event may be associated with the power draw indication exceeding a threshold (e.g., a current, voltage or power threshold). Thereafter, responsive to detection of the trigger event, an adjustment in (or adjusted maximum power limit on) power draw from the brake module may be initiated at operation 330.

Figure 4:
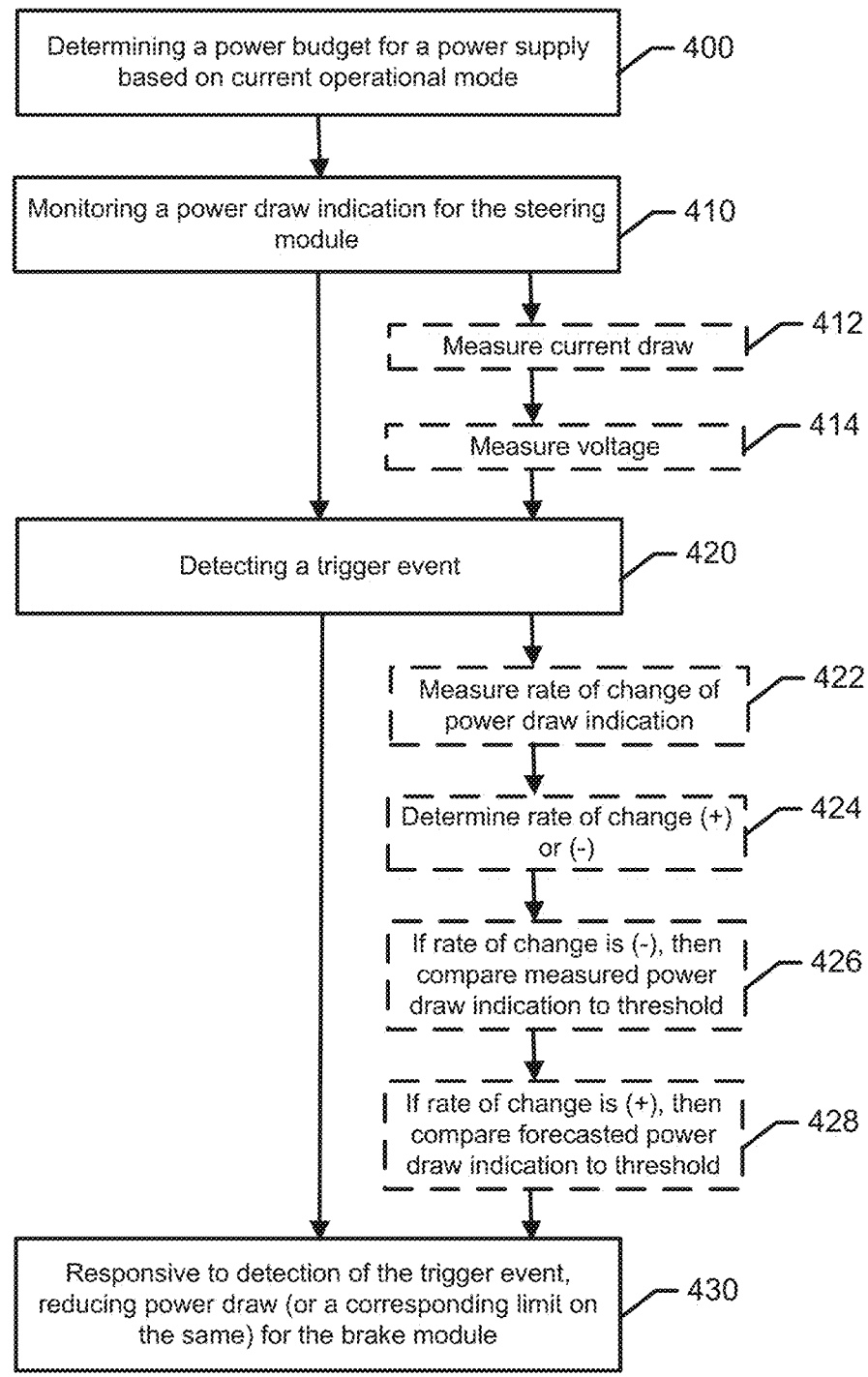
FIG. 4 illustrates a block diagram showing control flow associated with a power management algorithm that uses forecasted power draw information in accordance with an example embodiment.

In relation to FIG. 3, it should be appreciated that the location of the power management module 140 is assumed to be at the brake module 134 in this example. Thus, for example, the power management module 140 may be a separate module in the brake module 134, a sub-module of the brake module 134, or simply a portion of the brake module 134 that is configured to perform the functions of the power management module 140 as described herein. However, the location could be switched to the steering module 136, and the algorithm may otherwise run the same (except of course that the power draw indication is for the brake module instead of the steering module). Another change that may be initiated is that forecasting may be employed. FIG. 4 illustrates a block diagram of control flow that may be associated with execution of the power management algorithm 270 that employs forecasting in accordance with an example embodiment.

As shown in FIG. 4, an initial determination may be made as to a power budget for the power supply 138 based on the current operational mode at operation 400. In embodiments in which multiple different power budgets may correspond to different modes of operation, the determination may include receiving an indication of the current mode of operation and then selecting the corresponding power budget associated with the current mode of operation. If different power budgets are not employed in an example embodiment, then the determination may simply be noting the power budget already provided or programmed, which represents a limit to the total amount of power that can be delivered to the steering module 136 and the brake module 134. Thereafter, at operation 410, a power draw indication for power being drawn by the steering module may be monitored. The power draw indication may be, as shown by operation 412, a current measurement of current drawn by the steering module 136, or as shown by operation 414, a voltage measurement made at the steering module 136. In some cases, the monitoring of the power draw indication may include a combination of operations 412 and 414. Thus, it should be understood that operations 412 and 414, which are shown in dashed lines, may be optional operations that may form part of operation 410 either alone or in combination with each other.

Thereafter, at operation 420, a trigger event may be detected. The trigger event may, as noted above with respect to operation 410, include constituent or sub-operations, which are shown in dashed lines. In this regard, for example, operation 420 may include sub-operation 422, which is a determination as to the rate of change of the power draw indication. Thus, operation 422 may include measuring either or both the current draw or voltage measured at operations 412 and 414, or a rate of change or power draw calculated based on the current draw and voltage measured. After measuring the rate of change of the power draw indication, a determination may then be made as to whether the rate of change of the power draw indication is increasing or decreasing at operation 424. If the rate of change of the power draw indication is decreasing (i.e., less than zero, or negative), then the actual measured value (or a filtered, or otherwise processed version of a measured value) of the power draw indication may be used for comparing to a threshold (e.g., a current, voltage or power threshold) at operation 426. If the rate of change of the power draw indication is increasing (i.e., greater than zero, or positive), then a forecasted value of the power draw indication may be used for comparing to the threshold (e.g., a current, voltage or power threshold) at operation 428. Thereafter, responsive to detection of the trigger event, which is indicated by the measured or forecasted power draw indication exceeding the threshold, an adjustment of power draw from the brake module may be initiated at operation 430.

In an example embodiment, the maximum power draw from the brake module 134 may be calculated directly when flow proceeds through operation 426 as the power budget minus the currently measured power draw from the steering module 136. However, in practice, the maximum current draw from the brake module 134 may actually be calculated and/or controlled. Thus, the maximum current allowable for the brake module 134 may be calculated by first determining the difference between the power budget and the product of the measured steering module 136 values of current draw and voltage. This difference may then be multiplied by the brake module maximum power, and divided by the brake module voltage.

In an example embodiment, the maximum power draw from the brake module 134 may be calculated using forecasting when flow proceeds through operation 428 as the power budget minus the forecasted power draw from the steering module 136. However, in practice, the maximum current draw from the brake module 134 may actually be calculated and/or controlled as noted above. Thus, the maximum current allowable for the brake module 134 may be calculated by first determining the difference between the power budget and the product of the measured steering module 136 value of voltage and a sum of the measured current value and an adjustment factor that considers the rate of change of the current. This difference may then be multiplied by the brake module maximum power, and divided by the brake module voltage. The adjustment factor provides the forecasting that proactively addresses any possible delay associated with responding to real time measurements.

Thus, operations 400-430 result in the brake module 134 determining the power draw (either now or in the future, if forecasted) of the steering module 136, and then the brake module 134 adjusts its own power draw (or maximum power draw) to accommodate the power draw of the steering module 136 to ensure that the combined power draw of both modules stays below the power budget of the power supply 138 (either generally or for the current mode of operation). The power management module 140 may therefore be seen to actively balance brake and steering loads.

As noted above, operations 300-340 as executed in the example of FIG. 3 will tend to have the power management module 140 reacting to current measurements. Thus, the example of FIG. 4 introduces the possibility to employ forecasting of future measured values in order to account for any possible required adjustment that would occur via response to direct measurements of current values. The forecasting could be accomplished in different ways including the one described above, and other possible formulaic approaches as well.

A vehicle control system for a vehicle may therefore be provided. The vehicle control system may include a brake module operably coupled to a braking system of the vehicle to provide a braking torque request to the braking system, a steering module operably coupled to a steering system of the vehicle to provide a steering input request to the steering system, a power supply, and a power management module. The power supply may be operably coupled to the brake module and the steering module to provide power to the brake module and the steering module. The power supply may have a power budget indicating a maximum power providable to the brake module and the steering module. The power management module may be operably coupled to one or more sensors to receive a power draw indication from one of the brake module or the steering module and control power draw of the other of the steering module or the brake module to maintain a combined power draw of the brake module and the steering module below the power budget.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the power budget may be a first power budget associated with a first mode, or a second power budget that is less than the first power budget, where the second power budget is associated with a second mode. In an example embodiment, the power management module may receive a mode indicator to determine whether to employ the power budget as the first power budget or the second power budget. In some cases, the power management module may be associated with or part of the brake module, and may receive the power draw indication from the steering module to control power draw of the brake module to maintain the combined power draw below the power budget. In an example embodiment, controlling power draw of the brake module may include measuring the power draw indication associated with a measure of current draw or voltage of the steering module, detecting a trigger event, and, responsive to detection of the trigger event, adjusting a power draw or limit on power draw of the brake module. In some cases, the trigger event may correspond to the measured current draw or voltage of the steering module exceeding a threshold. In an example embodiment, the measure of current draw or voltage is a direct measurement made at a present time. In some cases, the measure of current draw is a forecasted measurement associated with a future time. In an example embodiment, detecting the trigger event may include measuring a rate of change of the power draw indication, comparing a current (i.e., present time) value of the power draw indication to a threshold in response to the rate of change of power draw indication being negative, and comparing a forecasted value of the power draw indication to the threshold in response to the rate of change of power draw indication being positive. In some cases, the forecasted value may also be determined based on the rate of change of power draw indication.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A vehicle control system of a vehicle, the system comprising:
    a brake module operably coupled to a braking system of the vehicle to provide a braking torque request to the braking system;
    a steering module operably coupled to a steering system of the vehicle to provide a steering input request to the steering system;
    a power supply operably coupled to the brake module and the steering module to provide power to the brake module and the steering module, the power supply having a power budget indicating a maximum power providable to the brake module and the steering module; and
    a power management module operably coupled to one or more sensors to receive a power draw indication from one of the brake module or the steering module and control power draw of the other of the steering module or the brake module to maintain a combined power draw of the brake module and the steering module below the power budget.

2. The vehicle control system of claim 1, wherein the power budget is a first power budget associated with a first mode, or a second power budget that is less than the first power budget, the second power budget being associated with a second mode.

3. The vehicle control system of claim 2, wherein the power management module receives a mode indicator to determine whether to employ the power budget as the first power budget or the second power budget.

4. The vehicle control system of claim 1, wherein the power management module is associated with or part of the brake module, and
wherein the power management module receives the power draw indication from the steering module to control power draw of the brake module to maintain the combined power draw below the power budget.

5. The vehicle control system of claim 4, wherein controlling power draw of the brake module comprises:
measuring the power draw indication associated with a measure of current draw or voltage of the steering module;
detecting a trigger event; and
responsive to detection of the trigger event, adjusting a power draw of the brake module.

6. The vehicle control system of claim 5, wherein the trigger event comprises the measured current draw or voltage of the steering module exceeding a threshold.

7. The vehicle control system of claim 5, wherein the measure of current draw is a direct measurement made at a current time.

8. The vehicle control system of claim 5, wherein the measure of voltage is made at a current time.

9. The vehicle control system of claim 5, wherein the measure of current draw is a forecasted measurement associated with a future time.

10. The vehicle control system of claim 5, wherein detecting the trigger event comprises:
measuring a rate of change of the power draw indication;
comparing a current value of the power draw indication to a threshold in response to the rate of change of power draw indication being negative; and
comparing a forecasted value of the power draw indication to the threshold in response to the rate of change of power draw indication being positive.

11. The vehicle control system of claim 10, wherein the forecasted value is determined based on the rate of change of power draw indication.

12. A method of protecting a power supply that powers a brake module and a steering module of a vehicle, the method comprising:
determining a power budget for the power supply;
monitoring a power draw indication for the steering module;
detecting a trigger event based on the power draw indication; and
responsive to detection of the trigger event, adjusting a power draw of the brake module.

13. The method of claim 12, wherein the power budget is a first power budget associated with a first mode, or a second power budget that is less than the first power budget, the second power budget being associated with a second mode.

14. The method of claim 13, wherein determining the power budget for the power supply comprises receiving a mode indicator to determine whether to employ the power budget as the first power budget or the second power budget.

15. The method of claim 12, wherein the trigger event comprises a measured current draw or voltage of the steering module exceeding a threshold.

16. The method of claim 15, wherein the measured current draw is a direct measurement made at a current time.

17. The method of claim 15, wherein the measured current draw is a forecasted measurement associated with a future time.

18. The method of claim 12, wherein detecting the trigger event comprises:
measuring a rate of change of the power draw indication; and
comparing a current value of the power draw indication to a threshold in response to the rate of change of power draw indication being negative.

19. The method of claim 12, wherein detecting the trigger event comprises:
measuring a rate of change of the power draw indication; and
comparing a forecasted value of the power draw indication to the threshold in response to the rate of change of power draw indication being positive.

20. The method of claim 19, wherein the forecasted value is determined based on the rate of change of power draw indication.

* * * * *